(12) United States Patent
Youssef

(10) Patent No.: US 10,288,909 B1
(45) Date of Patent: May 14, 2019

(54) CONTACT LENS DATA TRANSCEIVER

(71) Applicant: SPY EYE, LLC, Palo Alto, CA (US)

(72) Inventor: Shadi Youssef, San Jose, CA (US)

(73) Assignee: SPY EYE, LLC, Palo Alto, CA (US)

( * ) Notice: Subject to any disclaimer, the term of this patent is extended or adjusted under 35 U.S.C. 154(b) by 0 days.

(21) Appl. No.: 16/172,196

(22) Filed: Oct. 26, 2018

(51) Int. Cl.
| | | |
|---|---|---|
| *H04B 1/40* | (2015.01) | |
| *G02C 11/00* | (2006.01) | |
| *H04L 7/033* | (2006.01) | |
| *G02C 7/04* | (2006.01) | |
| *H04B 5/00* | (2006.01) | |
| *H04B 1/3827* | (2015.01) | |

(52) U.S. Cl.
CPC .............. *G02C 11/10* (2013.01); *G02C 7/041* (2013.01); *H04B 1/385* (2013.01); *H04B 5/0037* (2013.01); *H04B 5/0075* (2013.01); *H04L 7/0331* (2013.01)

(58) Field of Classification Search
CPC .... H04B 1/385; H04B 5/0037; H04B 5/0075; H04L 7/0331
USPC .......................................................... 455/75
See application file for complete search history.

(56) References Cited

U.S. PATENT DOCUMENTS

| | | | | |
|---|---|---|---|---|
| 4,495,117 A | * | 1/1985 | Feurer ................ | B29C 33/0022 264/1.36 |
| 7,701,299 B2 | | 4/2010 | Chenakin | |
| 8,608,310 B2 | * | 12/2013 | Otis ..................... | A61B 5/1486 351/159.03 |
| 8,870,370 B1 | * | 10/2014 | Otis ........................ | G02C 7/04 351/159.03 |
| 8,917,804 B2 | | 12/2014 | Seno et al. | |
| 9,024,727 B1 | * | 5/2015 | Otis ...................... | G01K 1/024 340/10.1 |
| 9,641,183 B2 | | 5/2017 | Wentzloff et al. | |
| 9,860,098 B2 | | 1/2018 | Wilkerson | |
| 9,933,620 B2 | * | 4/2018 | Van Heugten ........... | G02C 7/04 |
| 10,201,297 B1 | * | 2/2019 | Biederman ........ | A61B 5/14532 |
| 2006/0232426 A1 | * | 10/2006 | Sabeta ................. | A45C 11/005 340/572.8 |
| 2006/0267768 A1 | * | 11/2006 | Sabeta ................... | G07C 11/00 340/572.1 |
| 2007/0274626 A1 | * | 11/2007 | Sabeta ................. | A45C 11/005 385/24 |
| 2010/0065625 A1 | * | 3/2010 | Sabeta ................. | G06K 19/077 235/376 |
| 2010/0259719 A1 | * | 10/2010 | Sabeta ................. | A45C 11/005 351/159.06 |
| 2011/0028807 A1 | * | 2/2011 | Abreu .................. | A61B 3/1241 600/321 |
| 2011/0084834 A1 | * | 4/2011 | Sabeta ............. | G06K 19/07758 340/540 |
| 2012/0155549 A1 | * | 6/2012 | Oh ......................... | H04B 1/406 375/240.25 |

(Continued)

*Primary Examiner* — April G Gonzales
(74) *Attorney, Agent, or Firm* — North Weber & Baugh LLP

(57) ABSTRACT

Embodiments of the disclosure relate to a low-power, high-data-rate, radio transceiver inside a contact lens. The radio transceiver includes a phase-locked loop having a frequency acquisition loop that turns on and off based on various performance characteristics of the transceiver. The transceiver also includes wireless power harvesting circuitry that receives a wireless power signal and generates a reference signal that is used by an oscillator within the transceiver.

20 Claims, 5 Drawing Sheets

(56) References Cited

U.S. PATENT DOCUMENTS

| | | | |
|---|---|---|---|
| 2014/0240655 A1* | 8/2014 | Pugh | G02C 7/04 |
| | | | 351/158 |
| 2015/0054621 A1* | 2/2015 | Lin | G06K 19/0717 |
| | | | 340/10.1 |
| 2015/0057516 A1* | 2/2015 | Mujeeb-U-Rahman | |
| | | | A61B 5/0538 |
| | | | 600/346 |
| 2015/0363614 A1* | 12/2015 | Yeager | G06K 7/10158 |
| | | | 340/10.5 |
| 2017/0042480 A1* | 2/2017 | Gandhi | G02C 7/04 |
| 2017/0338985 A1 | 11/2017 | Wilkerson | |
| 2018/0017814 A1* | 1/2018 | Tuan | G02C 11/10 |
| 2018/0120568 A1* | 5/2018 | Miller | G02C 7/086 |
| 2018/0149884 A1* | 5/2018 | Miller | G02B 27/017 |
| 2018/0173304 A1* | 6/2018 | Lemoff | G03B 21/14 |
| 2018/0203252 A1* | 7/2018 | Perozziello | A61B 17/1671 |
| 2018/0224671 A1* | 8/2018 | Lemoff | G02C 7/049 |
| 2018/0316224 A1* | 11/2018 | Maynard | H02J 50/10 |
| 2018/0335836 A1* | 11/2018 | Miller | G06F 3/013 |
| 2018/0348620 A1* | 12/2018 | Miller | G02B 17/061 |
| 2019/0050643 A1* | 2/2019 | Ulman | G06K 9/00604 |

\* cited by examiner

CONTACT LENS DATA TRANSCEIVER

TECHNICAL FIELD

The disclosure is related to a low-power, high-data-rate, radio transceiver inside a contact lens.

BACKGROUND

Electronic contact lenses are under development for purposes as varied as sensing chemical changes in tear fluid, correcting age-related inability to change focus, and creating nearly invisible augmented reality displays. The first contact lens displays are based on Deering's invention of the femtoprojector; see e.g. U.S. Pat. No. 8,786,675, "Systems using eye mounted displays."

Femtoprojectors are tiny video projectors mounted inside a contact lens. Each femtoprojector contains a microdisplay image source (e.g. a light-emitting-diode microdisplay) and a projection optical system. The femtoprojectors project video images onto a person's retina. Prototype augmented reality contact lenses with femtoprojectors have recently been demonstrated in the lab.

Electronic contact lenses need a means of transmitting and receiving data to realize their full potential. Whether to communicate the results of a glucose test, receive focusing commands in a presbyopia-correcting lens, or update an augmented reality video stream, high-data-rate communications are a needed component of electronic contact lenses.

What is needed therefore is a low-power, high-data-rate, radio transceiver that fits inside a contact lens.

DETAILED DESCRIPTION OF EMBODIMENTS

Figure 1:
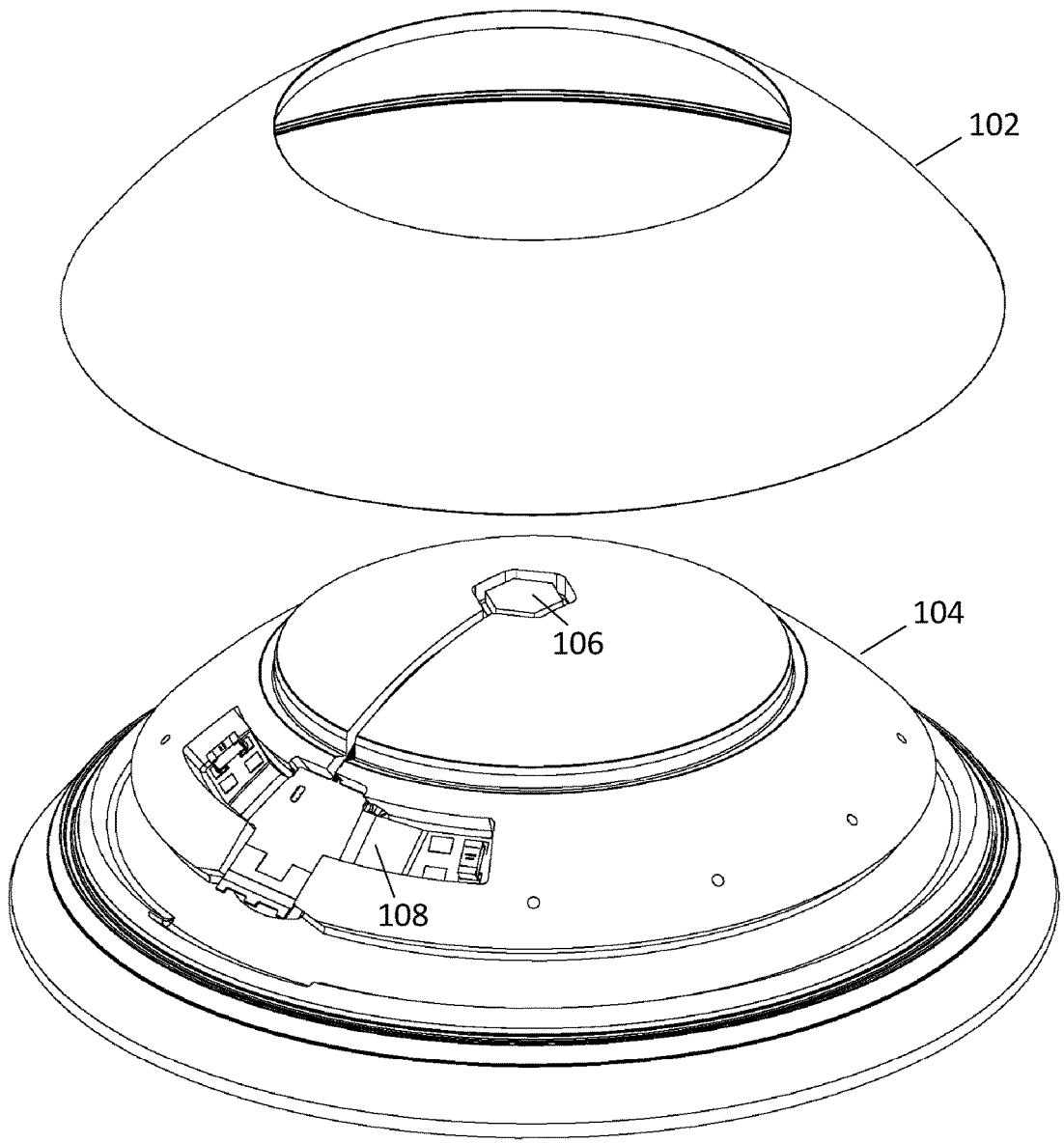
FIG. 1 is a partially exploded view of an electronic contact lens.

A contact lens data transceiver provides wireless, digital communications to and from a contact lens within severe size and power constraints. Only a small amount of electrical power is available on an electronic contact lens and that power is shared among video projection, motion sensing, image capture, computation and other tasks, not to mention radio communications. And, of course, modules for all of these functions must all fit within the small volume of a contact lens.

In a prototype augmented reality contact lens with a femtoprojector, power is delivered via magnetic induction from an accessory necklace or other accessory device. The electromagnetic field used for power transmission has a high-frequency (HF, i.e. within the range 1 to 30 MHz) carrier which may be used as a frequency reference and may even be modulated to provide limited data communication capability. Higher bit rate data communications may be achieved with a dedicated data transceiver operating with a carrier frequency in the gigahertz range.

However, conventional wireless data communications techniques are unsuitable for contact lenses. Some radio architectures such as those using the near-field communication (NFC) protocol do not provide enough range nor high enough data rate for contact lens applications. Other architectures such as WiFi or cellular standards are capable of gigabit per second data rates, but use far too much power to be practical in a contact lens. Even satellite radio communications techniques use too much power, some of it burned on features like Doppler tracking that are not needed in a contact lens.

Most wireless data receivers have certain tasks in common including demodulation and synchronization. When a radio frequency (RF) signal has a complex modulation scheme these operations are performed on in-phase and quadrature components of the signal simultaneously.

Conventional radio architectures rely extensively on phase-locked loops (PLL) as high frequency sources for local oscillator (LO) signals for demodulation and high speed clock signals for digital synchronization, both of which use a considerable amount of electrical power. Power consumption of digital circuits is proportional to the clock rate.

In contrast, a contact lens data receiver makes use of analog circuits to perform carrier synchronization. This permits clock synchronization (clock and data recovery (CDR) and data PLL) as well as all subsequent digital processing to be performed at the bit rate itself rather than at a multiple (e.g. 8×, 16×, etc.) of the bit rate.

Furthermore, a contact lens data transceiver is designed to waste as little power as possible on PLLs. Some PLLs in the transceiver are shared between functional blocks and certain PLLs are even turned off whenever possible to reduce power consumption. Turning off a receiver PLL is not appropriate in most conventional receivers because it also turns off the ability of the receiver to track changes in the frequency of the received carrier signal. In the environment of a contact lens communicating with a nearby accessory device, however, it can be made to work with appropriate scheduling.

Thus, a contact lens data transceiver is designed to provide megabit per second data communication rates while going to extreme lengths to save electrical power. Turning now to the figures, FIG. 1 is a partially exploded view of an electronic contact lens.

In FIG. 1, electronic contact lens 100 includes an oxygen permeable anterior cap 102 and a central core 104 that houses various electrical and electronic components such as femtoprojector 106 and integrated circuits 108. The lens may also include an oxygen permeable posterior cap that is not visible in FIG. 1. The caps may be made of rigid gas permeable plastics used to make scleral contact lenses, for example.

Electronic components such as a power conditioning chip, wireless data transceiver, microprocessor, accelerometers, magnetometers, gyroscopes, and chemical sensors may be mounted on a custom flex board embedded in the central core 104. The femtoprojector(s) 106 communicates with these components via ultra-fine flex interconnects. The central core 104 is sealed to prevent contact between the electronics and moisture. Holes through the central core 104 transmit oxygen that permeates through the anterior 102 and posterior caps.

Figure 2:
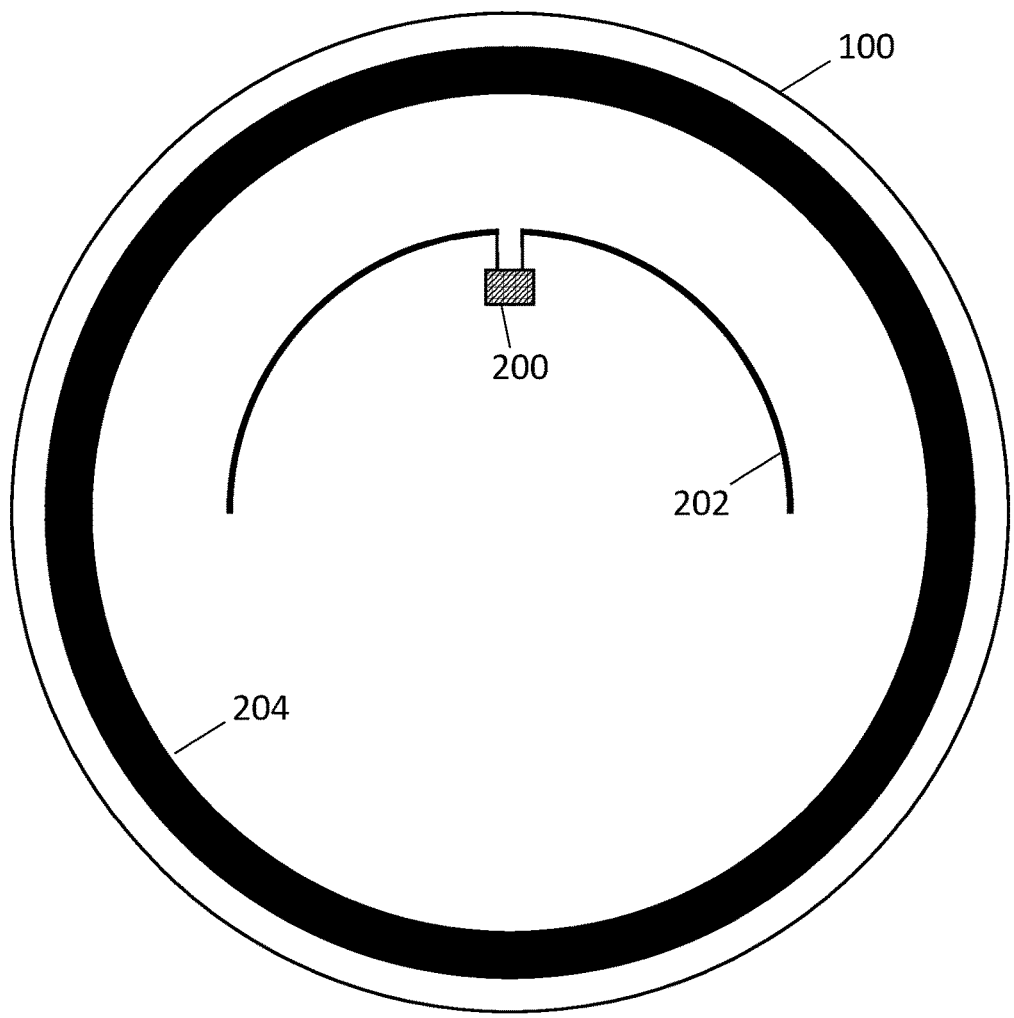
FIG. 2 is a heuristic diagram of a multi-turn power coil and an ultra-high-frequency radio antenna in a contact lens.

FIG. 2 is a heuristic diagram of a multi-turn power coil and an ultra-high-frequency (UHF, i.e. within the range 300 MHz to 30 GHz) radio antenna in a contact lens 100. In FIG. 2, contact lens data transceiver 200 is connected to a dipole antenna 202. An impedance matching network may be included as part of the antenna structure or implemented in discrete components. ¼-wave monopole, inverted F, planar inverted F and other types of ultra-high-frequency antennas may also be employed.

Power coil 204 receives power from an accessory device via magnetic induction. The power coil may be made of several turns of Litz wire each having dozens or even hundreds of insulated strands. Since the power is received as a carrier in the megahertz range, it may also serve as a frequency reference signal on the contact lens. In particular, the wireless power signal may be used to generate a reference signal that is used as an input into an oscillator (such as a voltage-controlled oscillator) from which a phase alignment signal is generated. This harvesting of a reference signal from the wireless power signal obviates the need for a crystal oscillator on the contact lens saving both power and space. A regulator may be coupled to receive the harvested power signal to regulate a direct current electrical power supply for components within the contact lens including the PLL.

Figure 3:
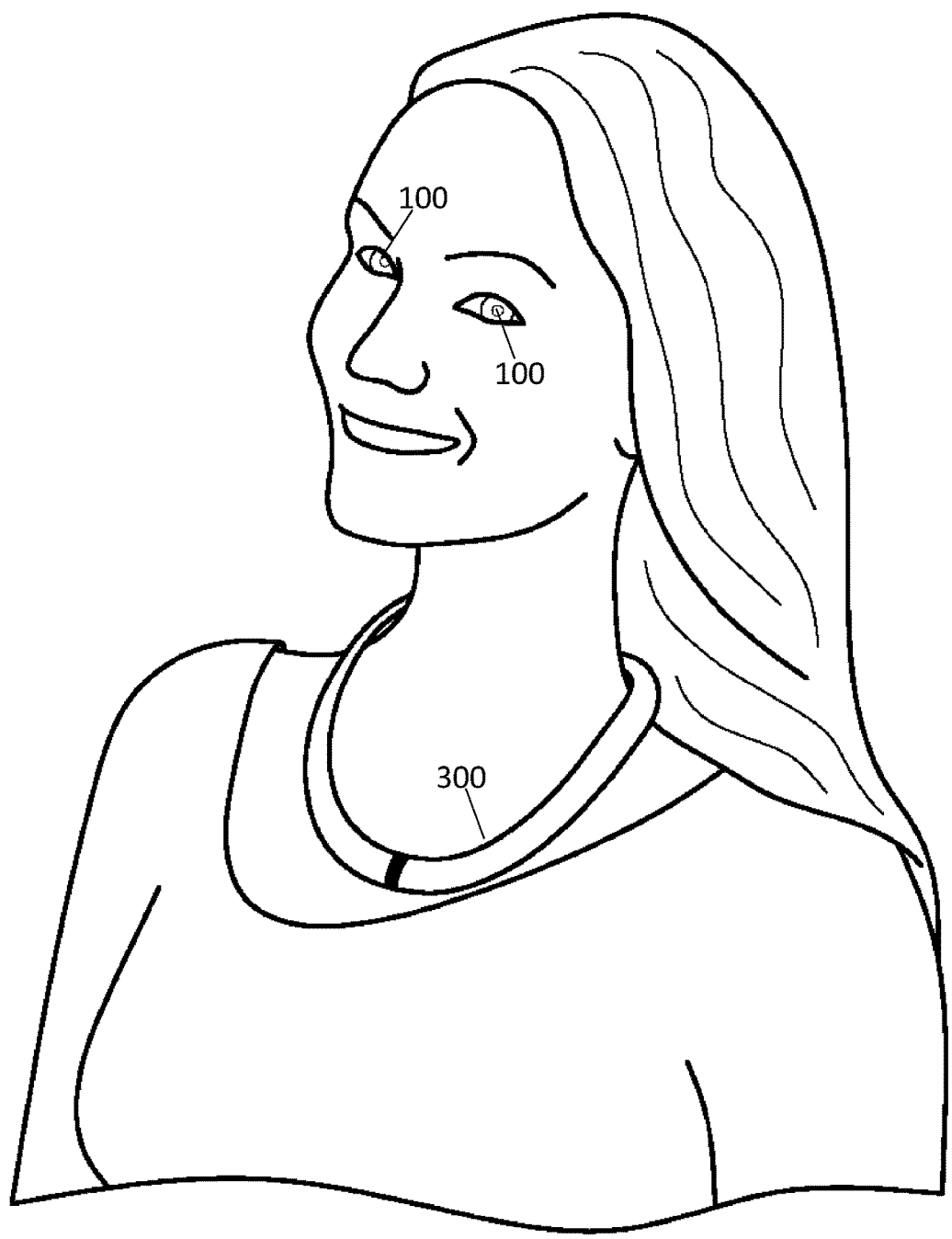
FIG. 3 shows a person wearing electronic contact lenses and an accessory necklace.

FIG. 3 shows a person wearing electronic contact lenses and an accessory necklace. A person may wear electronic contact lenses in one or both eyes. An accessory necklace 300 provides power to the lens(es) via magnetic induction. The necklace contains rechargeable batteries, a coil of wire extending around the circumference of the necklace, and electronic components such as data communications radios for communicating with the lens(es) and with WiFi, LTE, 5G, CDMA and other stations, navigation sensors (e.g. accelerometers, gyroscopes, magnetometers, global navigational satellite system (GNSS) receivers, barometers, etc.) and other devices such as microphones and speakers. Although the accessory device in FIG. 3 is worn as a necklace, accessory devices may also take other forms and be worn in different places such as inside a helmet or hat.

Figure 4:
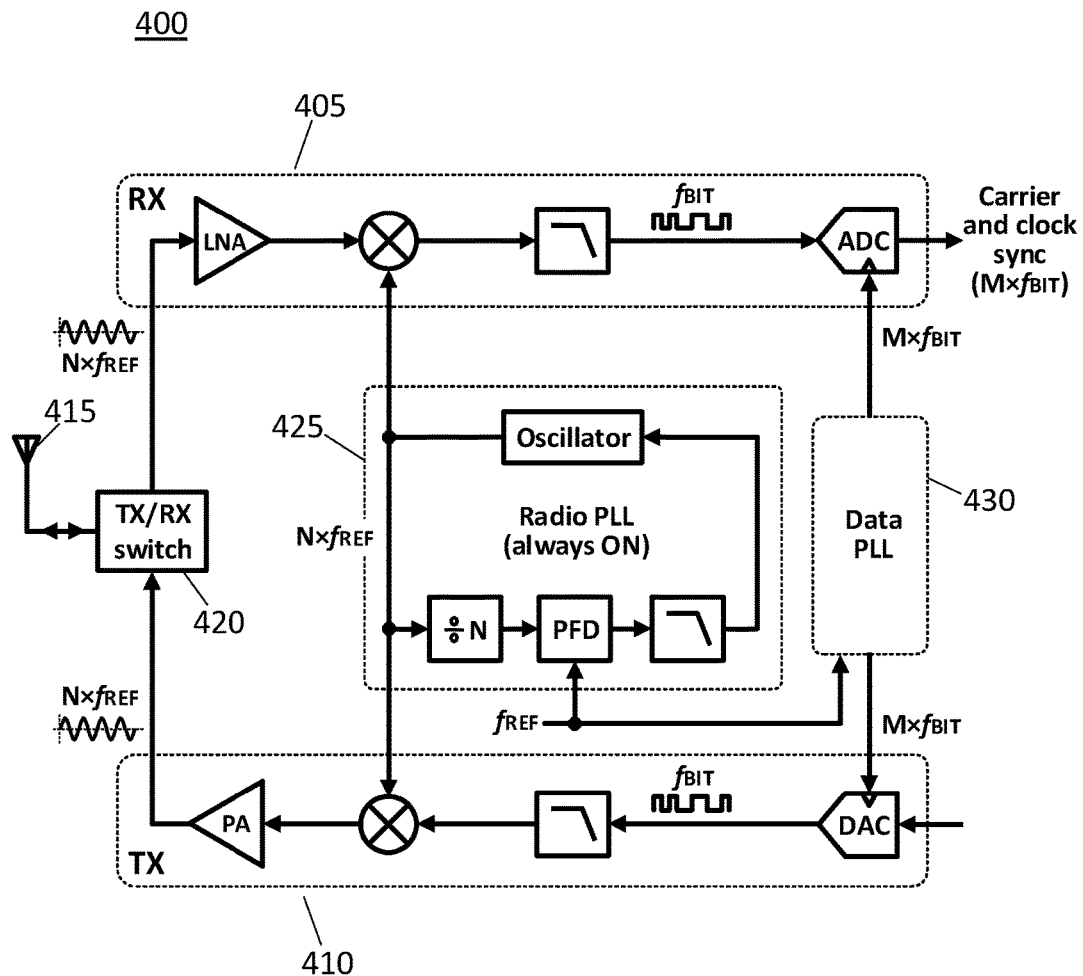
FIG. 4 is a schematic block diagram of elements of a conventional ultra-high-data-rate radio transceiver.

FIG. 4 is a schematic block diagram of elements of a conventional ultra-high-data-rate radio transceiver 400. FIG. 4 illustrates a conventional architecture suitable for WiFi, cellular or satellite communications, as examples. In FIG. 4, receiver section 405 and transmitter section 410 are connected to antenna 415 through transmit/receive switch 420. Radio PLL 425 provides a local oscillator signal to the receiver and transmitter sections, while data PLL 430 provides a timing sync signal to an analog to digital converter (ADC) in the receiver and a digital to analog converter (DAC) in the transmitter. (Other abbreviations in the figure include: low noise amplifier, LNA; power amplifier, PA; an integer that produces the carrier frequency when multiplied by a reference frequency $f_{REF}$, N; phase and frequency detector, PFD; an integer that produces a sampling rate when multiplied by a bit rate $f_{BIT}$, M. Symbols for radio frequency mixers and low-pass filters are familiar to those skilled in the art.)

In the architecture of FIG. 4, radio PLL 425 runs continuously and provides frequency agility for channel changes and Doppler tracking as needed. Data PLL 430 also runs continuously and operates at a multiple of the data bit rate of the system. For example, in a 100 megabit per second data transceiver, data PLL 430 may operate at 400 or 800 megabits per second or even 1.6 gigabits per second. Operating at a multiple of the bit rate provides an oversampling margin for the ADC in the receiver and the DAC in the transmitter to encode and decode data bits.

Furthermore, when using the architecture of FIG. 4, additional digital processing is required in blocks (not shown) after the receiver ADC for carrier phase and data clock synchronization. This additional processing is performed at a multiple, M, of the bit rate and power consumed to do so is proportional to M. Operations based on such high speed oversampling in digital circuits are not feasible in a contact lens transceiver because they require too much power.

Figure 5:
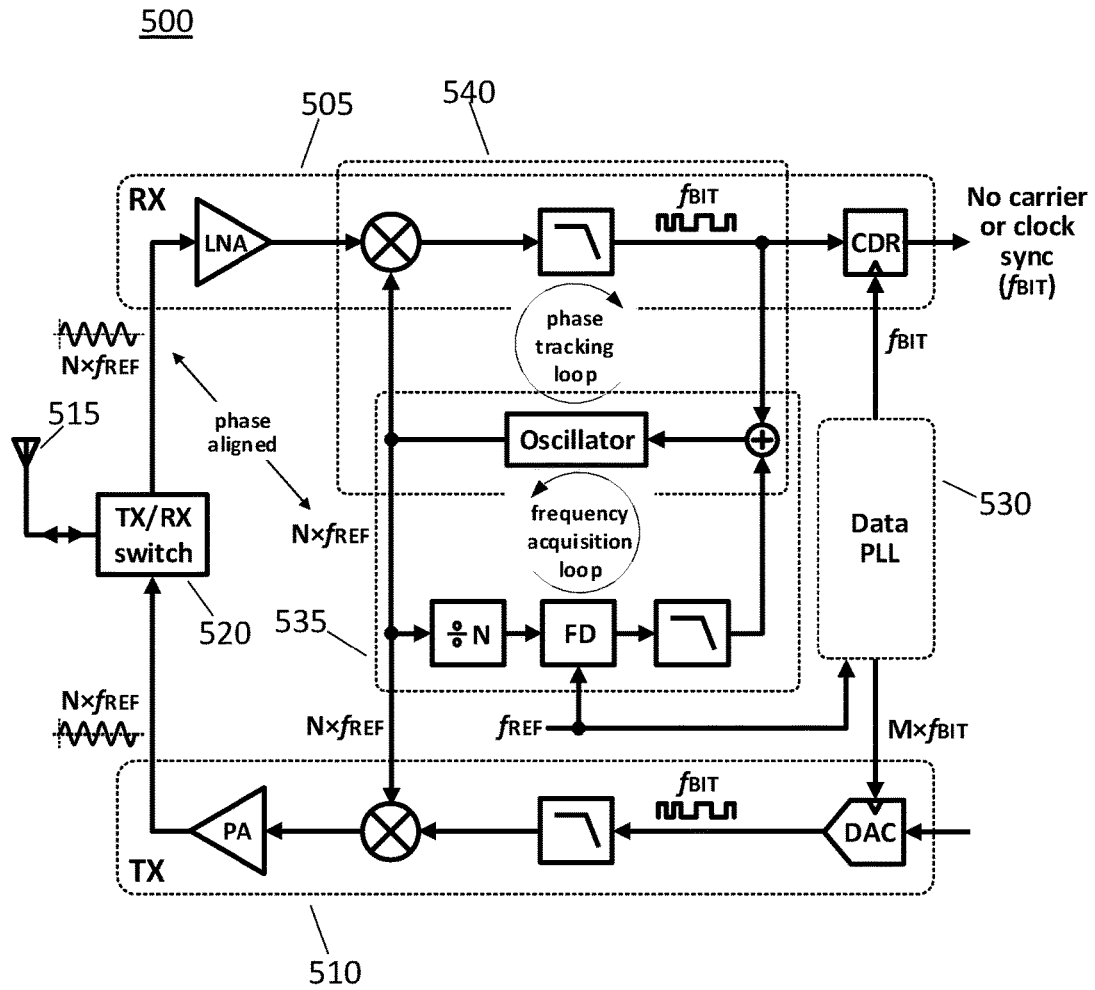
FIG. 5 is a schematic block diagram of elements of a high-data-rate radio transceiver designed for use inside a contact lens.

FIG. 5 is a schematic block diagram of elements of a high-data-rate radio transceiver 500 designed for use inside a contact lens. The transceiver 500 may be implemented as part of an integrated circuit chip that fits inside a contact lens. It is designed to operate with very low power, yet still enable megabit per second data communication rates. For example, a prototype transceiver provides 40 megabits per second over a 5 gigahertz carrier while consuming only about 150 microwatts average power. Typical WiFi and cellular radios consume several orders of magnitude more power, albeit while providing 100 megabits per second and higher data rates.

In FIG. 5, receiver section 505 and transmitter section 510 are connected to antenna 515 through transmit/receive switch 520. Data PLL 530 provides a timing sync signal to an analog to digital converter (ADC) in the receiver section 505 and a digital to analog converter (DAC) in the transmitter section 510. Carrier frequency acquisition loop 535 and carrier phase tracking loop 540 are PLLs that share a common voltage controlled oscillator (VCO). (Other abbreviations in the figure include: low noise amplifier, LNA; power amplifier, PA; an integer that produces the carrier frequency when multiplied by a reference frequency $f_{REF}$, N; phase and frequency detector, PFD; bit rate, $f_{BIT}$, flip-flop, FF. Symbols for radio frequency mixers, and gates and low-pass filters are familiar to those skilled in the art.)

In the contact lens data transceiver architecture of FIG. 5, frequency acquisition loop 535 need not run continuously. It is only needed if the carrier frequency changes and that may be restricted (by the overall design of the communications system) to not happen often. Turning loop 535 off when it is not needed provides valuable power savings. One criterion that may be used to decide when to turn of the frequency acquisition loop is the number of frame errors in received data as detected by cyclic redundancy checks (CRC) in the data. The frequency acquisition loop may remain turned off as long as the frame error rate is below an acceptable threshold level.

Phase tracking loop 540 performs carrier phase synchronization using analog techniques. It is followed by an analog clock and data recovery (CDR) block. The CDR block uses a bit rate clock supplied by data PLL 530. It does not require a clock at a multiple of the bit rate. This means that data PLL 530 consumes much less power than data PLL 430, and that the CDR in receiver 505 consumes much less power than oversampled digital processing used for CDR functions after the output of the ADC in receiver 405.

Furthermore, all subsequent digital processing of data output by the CDR in receiver 505 may take place clocked at the bit rate, $f_{BIT}$, rather than a multiple of the bit rate. This means that every digital processing unit (e.g., video processing, motion sensor processing) downstream of receiver 505 operates at the bit rate, i.e., as slow as possible, thereby saving power (by a factor of M) compared to similar processing units downstream of receiver 405.

Unlike transmitter section 410, transmitter section 510 does not include an oversampled DAC or a low-pass filter. The combination of low transmitted power and a simple modulation scheme (e.g. amplitude shift keying (ASK) or binary phase shift keying (BPSK)) allows for direct transmission of bits without the need for pulse shaping while still meeting spectral emission mask requirements. Therefore, a flip-flop (one-bit DAC) and a simple logic gate are used to modulate the radio carrier. Compared to transmitter section 410, transmitter section 510 uses at least M times less power.

The UHF radio transceiver 500 may be coupled to a femtoprojector and an integrated circuit that receives video image data from the UHF radio transceiver 500. The integrated circuit converts the video image data in to electronic signals that drive a light-emitting-diode microdisplay within the femtoprojector.

A femtoprojector may be integrated with a contact lens and comprise a microdisplay image source, such as a light-emitting-diode microdisplay, and a projection optical system to project images onto a person's retina. The femtoprojector may be communicatively coupled with any number of sensors, such as electrochemical sensor or motion sensors that generate motion data that may be transmitted form the UHF radio transceiver 500.

A system using UHF radio transceiver 500 may comprise an adjustable focus optical element and an integrated circuit that receives focus data from the UHF radio transceiver 500 and converts the data into electronic signals to drive the optical element to change its focus.

In conclusion, the architecture of transceiver 505 includes power saving techniques that permit its use under severe size and power constraints associated with a contact lens. Features such as continuous receiver tuning that are considered essential for conventional data radio applications are abandoned in the architecture of FIG. 5 to save power. Carrier phase tracking and frequency acquisition loops share a common VCO. The frequency acquisition loop is turned off whenever possible in normal operation. In addition, digital circuits operating at multiples of the data rate in the receiver and in other modules in the contact lens are avoided.

What is claimed is:

1. A contact lens comprising:
   an ultra-high-frequency (UHF) radio antenna contained within the contact lens;
   a UHF radio transceiver contained within the contact lens and connected to the UHF radio antenna via a transmit/receive switch, the UHF radio transceiver designed to operate at a bit rate of one megabit per second or more; and
   wherein the UHF radio transceiver comprises:
      an analog UHF carrier phase tracking loop and an analog UHF frequency acquisition loop that share a voltage-controlled oscillator, the frequency acquisition loop designed to be turned off periodically during normal transceiver operation; and
      an analog clock and data recovery module that is clocked no faster than the bit rate.

2. The contact lens of claim 1 further comprising:
   digital processing circuits that operate on data received by the UHF radio transceiver where no such circuits that operate on received data within the contact lens are clocked faster than the bit rate.

3. The contact lens of claim 1 further comprising:
   a high-frequency (HF) power coil that receives power via magnetic induction and an integrated circuit that conditions the received power to create a regulated direct-current electrical power supply for the UHF radio transceiver.

4. The contact lens of claim 3 wherein the UHF radio transceiver uses a reference frequency source that is based on a frequency of a wireless signal received by the HF power coil.

5. The contact lens of claim 4 wherein the HF power coil receives power from the wireless signal that is generated by an accessory device.

6. The contact lens of claim 1 further comprising:
   a femtoprojector and an integrated circuit that receives video image data from the UHF radio transceiver and converts the data in to electronic signals to drive a light-emitting-diode microdisplay within the femtoprojector.

7. The contact lens of claim 1 further comprising:
   an adjustable focus optical element and an integrated circuit that receives focus data from the UHF radio transceiver and converts the data into electronic signals to drive the optical element to change its focus.

8. The contact lens of claim 1 further comprising:
   an electrochemical sensor and an integrated circuit that receives electronic signals from the electrochemical sensor and converts them into data that is transmitted by the UHF radio transceiver.

9. The contact lens of claim 1 further comprising:
   motion sensors that output motion data that are transmitted by the UHF radio transceiver.

10. The contact lens of claim 1 wherein the UHF radio transceiver consumes less than 200 microwatts of power when transmitting and receiving data at a bit rate greater than one Megabit per second.

11. The contact lens of claim 1 wherein the UHF radio antenna is a dipole antenna.

12. The contact lens of claim 1 wherein the frequency acquisition loop is turned off unless a frame error rate of received data exceeds a threshold level.

13. The contact lens of claim 1 wherein the frequency acquisition loop is turned off unless a frame error rate of received data exceeds a threshold level.

14. A method for operating a contact lens, the method comprising:
    operating an ultra-high-frequency (UHF) transceiver that comprises a phase tracking loop and a frequency tracking loop, the UHF transceiver operates at a bit rate of one Megabit per second or more, the UHF transceiver being coupled to an analog clock and data recovery module;
    using the phase tracking loop to synchronize a carrier phase in the analog domain;
       turning off the frequency tracking loop during normal transceiver operation; and
    operating the analog clock and data recovery module at a clock rate that is no faster than the bit rate.

15. The method of claim 14 further comprising operating a digital processing circuit that is coupled to the UHF transceiver no faster than the bit rate.

16. The method of claim 14 further comprising using an integrated circuit to convert power that has been received by a high-frequency (HF) power coil via magnetic induction into a regulated direct-current to energize the UHF radio transceiver.

17. The method of claim 14 wherein the HF power coil receives power from a wireless signal that is generated by an accessory device.

18. The method of claim 14 further comprising using a femtoprojector to receive video image data from the UHF radio transceiver and convert the data in to electronic signals to drive a light-emitting-diode microdisplay within the femtoprojector.

19. The method of claim 14 further comprising using an adjustable focus optical element to receive focus data from the UHF radio transceiver and convert the data into electronic signals to drive the optical element to change its focus.

20. The method of claim 14 wherein the UHF radio transceiver consumes less than 200 microwatts of power when transmitting and receiving data at a bit rate greater than one Megabit per second.

\* \* \* \* \*

UNITED STATES PATENT AND TRADEMARK OFFICE
CERTIFICATE OF CORRECTION

PATENT NO.         : 10,288,909 B1
APPLICATION NO.    : 16/172196
DATED              : May 14, 2019
INVENTOR(S)        : Shadi Youssef Page 1 of 1

It is certified that error appears in the above-identified patent and that said Letters Patent is hereby corrected as shown below:

In the Claims

Claim 13 is a duplicate of Claim 12; therefore Claim 13 needs to be deleted entirely. This will change the numbering of the following claims:
Claim No. 14 should be numbered 13.
Claim No. 15 should be numbered 14.
Claim No. 16 should be numbered 15.
Claim No. 17 should be numbered 16.
Claim No. 18 should be numbered 17.
Claim No. 19 should be numbered 18.
Claim No. 20 should be numbered 19.
At Column 50, Line 1, Claim 15, "The method of claim 14," should read -- The method of claim 13 --.
At Column 53, Line 1, Claim 16, "The method of claim 14," should read -- The method of claim 13 --.
At Column 58, Line 1, Claim 17, "The method of claim 14," should read -- The method of claim 13 --.
At Column 61, Line 1, Claim 18, "The method of claim 14," should read -- The method of claim 13 --.
At Column 66, Line 1, Claim 19, "The method of claim 14," should read -- The method of claim 13 --.
At Column 71, Line 1, Claim 20, "The method of claim 14," should read -- The method of claim 13 --.
Add Column 75, to add Claim 20, and it should read -- The contact lens of Claim 1 wherein the frequency acquisition loop is turned off unless a frame error rate of received data exceeds a threshold level --.

Signed and Sealed this
Second Day of July, 2019

Andrei Iancu
*Director of the United States Patent and Trademark Office*